United States Patent
Ashikaga et al.

(10) Patent No.: US 9,633,580 B2
(45) Date of Patent: Apr. 25, 2017

(54) LABEL FOR IN-MOLD MOLDING, IN-MOLD MOLDED ARTICLE AND METHOD FOR MOLDING SAME

(75) Inventors: Mitsuhiro Ashikaga, Ibaraki (JP); Masaki Shiina, Ibaraki (JP); Yasuo Iwasa, Kamisu (JP)

(73) Assignee: YUPO CORPORATION, Tokyo (JP)

( * ) Notice: Subject to any disclaimer, the term of this patent is extended or adjusted under 35 U.S.C. 154(b) by 393 days.

(21) Appl. No.: 13/501,873

(22) PCT Filed: Oct. 13, 2010

(86) PCT No.: PCT/JP2010/067909
§ 371 (c)(1),
(2), (4) Date: Jul. 18, 2012

(87) PCT Pub. No.: WO2011/046126
PCT Pub. Date: Apr. 21, 2011

(65) Prior Publication Data
US 2012/0315447 A1 Dec. 13, 2012

(30) Foreign Application Priority Data
Oct. 14, 2009 (JP) ................................. 2009-237617

(51) Int. Cl.
G09F 3/04 (2006.01)
B29C 45/14 (2006.01)
(Continued)

(52) U.S. Cl.
CPC ................ *G09F 3/04* (2013.01); *B29C 45/14* (2013.01); *B29C 45/78* (2013.01); *B32B 7/005* (2013.01);
(Continued)

(58) Field of Classification Search
CPC .... B29C 2045/1673; B29C 2049/2017; B29C 2049/2021; B29C 2049/2472;
(Continued)

(56) References Cited

U.S. PATENT DOCUMENTS 6,287,684 B1   9/2001   Yamanaka et al.
6,576,325 B1   6/2003   Yamanaka et al.
(Continued)

FOREIGN PATENT DOCUMENTS

EP          254923         2/1988
EP       1041529 A1       10/2000
(Continued)

OTHER PUBLICATIONS

International Preliminary Report on Patentability for International Application No. PCT/JP2010/067909, dated Apr. 17, 2012.
(Continued)

*Primary Examiner* — Gerard Higgins
(74) *Attorney, Agent, or Firm* — Greenblum & Bernstein, P.L.C.

(57) ABSTRACT

A label for in-mold molding, which comprises a laminate film comprising a substrate layer (A) and a heat-sealable resin layer (B), wherein the substrate layer (A) comprises a thermoplastic resin in an amount of from 40 to 90% by weight and at least one of an inorganic fine powder and an organic filler in an amount of from 10 to 60% by weight, the heat-sealable resin layer (B) comprises a thermoplastic resin in an amount of from 50 to 100% by weight, the laminate film is at least uniaxially stretched, the porosity of the laminate film is from 10% to 45%, the thermal conductivity of the label is from 0.04 to 0.11 W/mK, and the bonding strength of the label stuck to an adherend formed of a propylene-based resin at 200° C. and 60 MPa is from 250 to 1500 g/15 mm.

20 Claims, 1 Drawing Sheet

(51) Int. Cl.

| | |
|---|---|
| *B29C 45/78* | (2006.01) |
| *B32B 27/08* | (2006.01) |
| *B32B 27/20* | (2006.01) |
| *B32B 27/32* | (2006.01) |
| *B32B 7/00* | (2006.01) |
| *B32B 27/28* | (2006.01) |
| *G09F 3/02* | (2006.01) |

(52) U.S. Cl.
 CPC .............. *B32B 27/08* (2013.01); *B32B 27/20* (2013.01); *B32B 27/28* (2013.01); *B32B 27/32* (2013.01); *B32B 27/327* (2013.01); *B29C 2045/14918* (2013.01); *B32B 2457/00* (2013.01); *G09F 2003/0255* (2013.01); *Y10T 428/24802* (2015.01); *Y10T 428/249992* (2015.04)

(58) Field of Classification Search
 CPC .... B29C 2049/4858; B29C 2049/4869; B29C 2049/4871; B29C 2791/001; B29C 93/009; B29C 33/0016; B29C 33/306; B29C 33/485; B29C 37/0025; B29C 43/021; B29C 44/0407; B29C 44/586; B29C 45/1418; B29C 45/14221; B29C 45/14336; B29C 45/14754; B29C 45/14811; B29C 45/14827; B29C 45/16; B29C 45/1704; B29C 49/02; B29C 49/20; B29C 49/22; B29C 65/00; B29C 66/71; B29C 2045/14918; B29C 66/24223; B29C 66/24244; B29C 66/24245; B29C 66/534; B29C 66/7212; B29C 2049/2412; B29C 2791/006; B29C 33/00; B29C 45/0046; B29C 45/14475; B29C 45/14688; B29C 45/14836; B29C 45/372; B29C 49/04; B29C 49/06; B29C 49/2408; B29C 51/10; B29C 66/723; B29C 70/342; B29C 70/443; B29C 2037/0042; B29C 2045/14237; B29C 2045/142; B29C 49/6409; B29C 51/02; B29C 51/14; B29C 65/18; B29C 65/40; B29C 65/70; B29C 66/038; B29C 66/0382; B29C 66/0384; B29C 66/1122; B29C 66/1142; B29C 66/133; B29C 66/4322; B29C 66/5344; B29C 66/72321; B29C 66/72328; B29C 66/7234; B29C 66/73116; B29C 66/81427; B29C 66/8322; B29C 66/91; B29C 66/919; B29C 69/02; B29C 70/021; B29C 70/44; B29C 70/543; B29C 70/548; B29L 2031/712; B29L 2009/00; B29L 2031/744; B32B 27/08; B32B 17/00; B32B 2255/10; B32B 2255/205; B32B 2307/518; B32B 2307/7244; B32B 2307/7246; B32B 2307/75; B32B 2519/00; B32B 27/06; B32B 27/32; B32B 37/12; B32B 3/10; B32B 3/26; B32B 3/263; B32B 9/045; B65D 51/245; B65D 2203/02; B65D 12/02; B29D 22/003; B65B 51/10; B65B 61/00; B65B 7/28; G09F 3/02
 USPC ........... 206/459.5, 229; 428/195.1, 161, 200, 428/201, 343, 349, 354, 35.7, 99; 264/259, 279, 161, 257, 316, 39, 41, 509, 264/526, 541, 571; 425/112, 394, 506, 425/577; 427/207.1, 248.1, 264, 265, 427/270, 277, 290, 558
 See application file for complete search history.

(56) References Cited

U.S. PATENT DOCUMENTS

| | | | |
|---|---|---|---|
| 6,761,969 B2 * | 7/2004 | Li et al. | 428/354 |
| 8,021,727 B2 | 9/2011 | Shiina et al. | |
| 2005/0100751 A1 | 5/2005 | Nishizawa et al. | |
| 2007/0218227 A1 * | 9/2007 | Nishizawa et al. | 428/35.7 |
| 2009/0291257 A1 * | 11/2009 | Shiina et al. | 428/138 |
| 2012/0040197 A1 | 2/2012 | Suzuki et al. | |

FOREIGN PATENT DOCUMENTS

| | | |
|---|---|---|
| EP | 1369220 A1 | 12/2003 |
| EP | 1055715 A1 | 11/2011 |
| JP | 58-069015 | 4/1983 |
| JP | 2-7814 | 2/1990 |
| JP | 02-084319 | 3/1990 |
| JP | 06-230725 A | 8/1994 |
| JP | 09-220798 A | 8/1997 |
| JP | 09-230791 A | 9/1997 |
| JP | 10-177343 A | 6/1998 |
| JP | 2002-307480 | 10/2002 |
| JP | 2006-048016 | 2/2006 |
| JP | 2006-289818 | 10/2006 |
| JP | 2006-309175 | 11/2006 |
| JP | 2007-307831 | 11/2007 |
| JP | 2009-040038 | 2/2009 |
| WO | 01/07234 A1 | 2/2001 |
| WO | WO 2006106775 A1 * | 10/2006 |
| WO | 2010/087148 A1 | 8/2010 |

OTHER PUBLICATIONS

English Translation of International Preliminary Report on Patentability and Written Opinion for International Application No. PCT/JP2010/067909, dated May 15, 2012.
Search report from International Application No. PCT/JP2010/067909, mail date is Jan. 18, 2011.
Japanese Office Action issued with respect to Japanese Patent Application No. 2010-230188, mail date is Nov. 19, 2013.
The extended European search report issued with respect to European application No. 10823394.1, mail date is Mar. 4, 2014.

* cited by examiner

LABEL FOR IN-MOLD MOLDING, IN-MOLD MOLDED ARTICLE AND METHOD FOR MOLDING SAME

TECHNICAL FIELD

This disclosure relates to a label for in-mold molding, as well as to an in-mold molded article using it and to a method for molding it. This disclosure is applicable to various labels such as typically caution labels, and is usable in various industries such as typically motor vehicle industry and home electronics industry.

BACKGROUND ART

Caution labels are stuck to automobiles and home electric appliances for calling for attention in use thereof. On a caution label, printed is a direction such as a warning mark or a precaution note to observe in use; and such a caution label is stuck to products or product parts and is used for calling for attention to injury or fire in erroneous use. On a caution label, the printed direction must be deciphered irrespective of the adherend to which the label is stuck, and therefore a high-opacity base is used for the label.

Regarding automobile parts in an engine room, a caution label is stuck to a reserve tank, a fan tunnel, a battery tank, an air cleaner box, an engine cover, a belt cover, a fuse box, etc. For the above parts, used is resin for body weight saving, and in particular, a propylene-based resin is used from the viewpoint of the moldability and the cost thereof, and the resin is molded mostly according to an injection molding method. In the injection molding method, a resin is melted in a heating cylinder, then injected into the cavity of a closed mold at high temperature and under high pressure, and cooled and solidified in the mold to thereby form therein an article corresponding to the shape of the mold cavity.

Heretofore, as the caution label to be stuck to such injection-molded parts, a self-adhesive label is used. However, the self-adhesive label is problematic in that, when used for a long period of time, it may peel away from its edge owing to friction, vibration or impact shock, or in case where the label is forcedly peeled away, the entire label may peel away thereby failing in satisfactory attention-seeking purpose. In addition, when a self-adhesive label is stuck to an adherend and in case where the label is stuck to the just-molded adherend, then the molded adherend may shrink with time therefore bringing about some problems in that the label is swollen or the label surface is wrinkled; and therefore, the molded adherend must be stored as an intermediate stock until their shrinkage could settle.

As a method for solving these problems, employed is a technique of in-molding molding of integrally molding an adherend with a label. The method comprises previously inserting a label into a mold, and then injection-molding an adherend in the mold simultaneously with melt-adhering the label to the adherend (see Patent Reference 1, Patent Reference 2). As the label for in-mold molding of the type, there are known a gravure-printed resin film, a multicolor offset-printed synthetic paper (for example, see Patent Reference 3, Patent Reference 4), a synthetic paper comprising a heat-sealable layer having a porous surface and a print layer (see Patent Reference 5), etc.

CITATION LIST

Parent References

Patent Reference 1: JP-A 58-69015
Patent Reference 2: EP-A 254923
Patent Reference 3: JP-B 2-7814
Patent Reference 4: JP-A 2-84319
Patent Reference 5: JP-A 2006-309175

SUMMARY

Recently, for enforcement of laws such as Act on Temporary Measures for Promotion of Rational Uses of Energy and Recycled Resources in Business Activities (Energy Saving Act) and for countermeasure against environmental issues, energy saving has become desired even in the production process for the above-mentioned adherends. In the in-mold process of injection-molding, the energy consumption could be reduced by improving the heat insulating property of an injection molding machine itself, shortening the molding cycle from melting the resin to be injected to cooling and solidification thereof, and by lowering the temperature and the pressure of the resin to be injected. For example, heretofore, in a case of injection-molding of a propylene-based resin, the adherend is molded at an injection temperature of 230° C. from the viewpoint of increasing the flowability of the resin to thereby reduce the molding loss; however, it may be possible to lower the injection temperature to 200° C. and to lower the injection pressure by optimizing the gate hole position and the temperature of the mold. In this case, the molding cycle can be shortened and the energy necessary for melting the resin can be reduced, and therefore the energy consumption for molding the adherend can be thereby reduced.

However, when the temperature and the pressure of the resin to be injected are lowered in such a manner, then the resin to form the adherend would be cooled and solidified before melt-adhered to the label for in-mold molding, and therefore the bonding strength between the adherend and the label for in-mold molding may lower, thereby bringing about some problems in that the label may swell or may peel away. For example, in the case where the synthetic paper described in the above-mentioned Patent Reference 5 is used, the injected resin melt could hardly penetrate into the pores in the surface of the heat-sealable layer, and therefore a sufficient bonding strength could not be attained between the adherend and the label.

It could be helpful to solve these problems in the prior art as above, and it could be helpful to provide a label for in-mold molding capable of securing a satisfactory bonding strength between the adherend and the label even though the adherend is molded under the condition where the temperature and the pressure of the resin to be injected are lowered, and enabling deciphering of the direction printed on the label, and to provide a labeled in-mold molded article.

The present inventors have assiduously studied for solving these problems and, as a result, have found that, when a laminate resin film, in which at least a substrate layer contains an inorganic fine powder or an organic filler, is stretched so as to have a specific porosity and formed into a label having a specific thermal conductivity, then A label for in-mold molding and a labeled in-mold molded article can be provided, in which the label has a sufficient bonding strength to the adherend to which it is stuck, under the condition where the temperature and the pressure of the resin to be injected are lowered, and in which the printed direction can be deciphered, and have completed the disclosure.

We thus provide a label for in-mold molding and a labeled in-mold molded article each having the configuration mentioned below.

(1) A label for in-mold molding, which comprises a laminate film containing a substrate layer (A) and a heat-sealable resin layer (B) and is characterized in that the substrate layer (A) contains a thermoplastic resin in an amount of from 40 to 90% by weight and at least one of an inorganic fine powder and an organic filler in an amount of from 10 to 60% by weight, the heat-sealable resin layer (B) contains a thermoplastic resin in an amount of from 50 to 100% by weight, the laminate film is at least uniaxially stretched, the porosity of the laminate film is from 10% to 45%, the thermal conductivity of the label is from 0.04 to 0.11 W/mK, and the bonding strength of the label stuck to an adherend formed of a propylene-based resin at 200° C. and 60 MPa is from 250 to 1500 g/15 mm.

(2) The label for in-mold molding of (1), wherein the substrate layer (A) has a multilayer structure.

(3) The label for in-mold molding of (1) or (2), wherein the heat-sealable resin (B) contains at least one selected from a propylene homopolymer, a propylene block copolymer and a propylene random copolymer.

(4) The label for in-mold molding of any one of (1) to (3), wherein the substrate layer (A) has a coat layer on the surface thereof.

(5) The label for in-mold molding of (4), wherein the coat layer is printed.

(6) The label for in-mold molding of any one of (1) to (5), wherein the substrate layer (A) is printed on at least one side thereof.

(7) The label for in-mold molding of (5) or (6), which further has a protective layer on the printed layer.

(8) The label for in-mold molding of any one of (1) to (7), of which the opacity is from 40 to 100%.

(9) A labeled in-mold molded article, which has the label for in-mold molding of any one of (1) to (8) stuck to an adherend.

(10) The labeled in-mold molded article of (9), wherein the adherend is formed of a propylene-based resin.

(11) The labeled in-mold molded article of (9) or (10), which is used in automobiles or home electric appliances.

(12) A molding method for a labeled in-mold molded article, which comprises previously inserting the label for in-mold molding of any one of (1) to (8) into a mold, and then injecting a molten propylene-based resin at 200° C. or higher into the mold to thereby give an in-mold molded article that has been labeled simultaneously with molding.

(13) The molding method for a labeled in-mold molded article of (12), wherein the temperature of the molten propylene-based resin to be injected is from 200 to 220° C.

(14) The molding method for a labeled in-mold molded article of (12), wherein the temperature of the molten propylene-based resin to be injected is from 200 to 210° C.

When the label of this disclosure is used and even when a labeled in-mold molded article is molded under the condition where the temperature and the pressure of the resin to be injected are lowered, the label can have a sufficient bonding strength to the adherend and the direction printed on the label can be deciphered.

Figure 1:
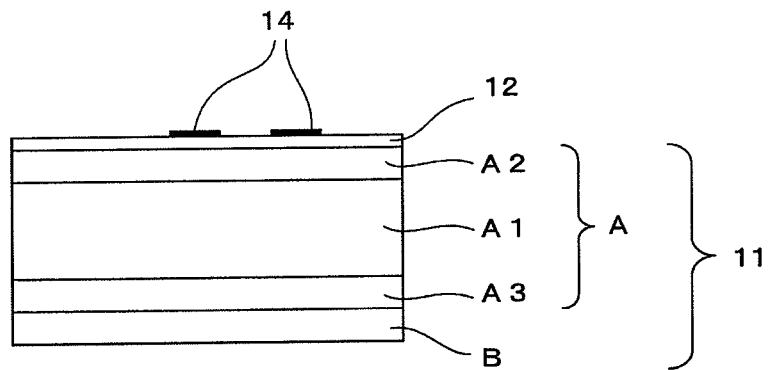
FIG. 1 This is a schematic cross-sectional view of the label for in-mold molding of Example 1.

The label for in-mold molding and the labeled in-mold molded article are described in detail hereinunder. The description of the constitutive elements given hereinunder is for some typical embodiments, to which, however, this disclosure should not be limited. In this description, the numerical range expressed by the wording "a number to another number" means the range that falls between the former number indicating the lowermost limit of the range and the latter number indicating the uppermost limit thereof.

Substrate Layer (A):

In the laminate film constituting the label for in-mold molding, the substrate layer (A) is a support of the label and imparts strength, printing aptitude, opacity, water resistance, chemical resistance, thermal insulation performance and the like to the label. In addition, in in-mold molding the label, the layer supports the heat-sealable resin layer (B) to facilitate the molding.

[Thermoplastic Resin]

The substrate layer (A) is a layer containing at least a thermoplastic resin. As the thermoplastic resin for use for the substrate layer (A), there are mentioned olefinic resin such as propylene-based resin, high-density polyethylene, middle-density polyethylene, polymethyl-1-pentene, ethylene-cyclic olefin copolymer, etc., polyethylene terephthalate resin, polyvinyl chloride resin, amide resin such as nylon-6, nylon-6,6, nylon-6,10, nylon-6,12, etc., ABS resin, ionomer resin, etc. Preferred are thermoplastic resins having a melting point of from 130 to 280° C., such as propylene-based resin, high-density polyethylene, polyethylene terephthalate resin, etc. Two or more these resins may be used here as combined. Of those, preferred is use of propylene-based resin from the viewpoint of the chemical resistance and the production cost thereof.

As the propylene-based resin, preferred here is use of an isotactic polymer or syndiotactic polymer of propylene homopolymer. Also usable here are propylene-based copolymers having different types of stereoregularity, which are produced through copolymerization of propylene with an a-olefin such as ethylene, 1-butene, 1-hexene, 1-heptene, 4-methyl-1-pentene, etc. The copolymers may be binary ones or ternary or more multicomponent copolymers, and may be random copolymers or block copolymers.

[Inorganic Fine Powder and/or Organic Filler]

The substrate layer (A) contains at least one of an inorganic fine powder and an organic filler, in addition to the thermoplastic resin therein, and contains pores formed around it serving as a nucleus, from the viewpoint of the opacity and the thermal insulation performance thereof. The inorganic fine powder to be used here is one having a mean particle size of generally from 0.01 to 15 μm, but preferably from 0.01 to 8 μm, more preferably from 0.03 to 4 μm from the viewpoint of attaining stable film stretching or uniform pore formation. As the inorganic fine powder, there may be exemplified heavy calcium carbonate, light calcium carbonate, calcined clay, talc, barium sulfate, diatomaceous earth, magnesium oxide, zinc oxide, titanium oxide, silicon oxide, or composite inorganic fine powder having an oxide or hydroxide of aluminium around the nuclei of a hydroxyl group-containing inorganic fine powder such as silica, as well as hollow glass beads, etc. There may be also exemplified surface-processed products prepared by processing the above-mentioned inorganic fine powder with various types of surface-treating agents. Above all, preferred is use of heavy calcium carbonate, light calcium carbonate, calcined clay or talc, as they are inexpensive and secure good moldability. More preferred is heavy calcium carbonate.

Like the inorganic fine powder, the organic filler for use herein has a mean particle size, after dispersion, of generally from 0.01 to 15 μm, but preferably from 0.01 to 8 μm, more preferably from 0.03 to 4 μm. As the organic filler, there are exemplified polyethylene terephthalate, polybutylene terephthalate, polyamide, polycarbonate, polyethylene naphthalate, polystyrene, polymer and copolymer of acrylate or methacrylate, melamine resin, polyethylene sulfide, polyimide, polyethyl ether ketone, polyphenylene sulfide, homopolymer of cyclic olefin, copolymer of cyclic olefin and ethylene, etc. Above all, preferred is use of a resin having a melting point higher than that of the thermoplastic resin of the substrate layer and immiscible with the thermoplastic resin. For example, in case where an olefinic resin is used as the substrate layer, at least one selected from polyethylene terephthalate, polybutylene terephthalate, polyamide, polycarbonate, polyethylene naphthalate, polystyrene, homopolymer of cyclic olefin and copolymer of cyclic olefin and ethylene is preferred for use as the organic filler.

At least one or more are selected from the above-mentioned inorganic fine powder and organic filler, and one or more of these may be used either singly or as combined. When the inorganic fine powder and the organic filler are compared with each other, more preferred is the inorganic fine powder from the viewpoint that the heat of quantity to be generated in combustion thereof is small.

The mean particle size of the inorganic fine powder may be represented, as one example, by the particle size corresponding to 50% in cumulative distribution (cumulative 50% particle size) measured with a laser diffractiometric particle sizer "Microtrack" (trade name of Nikkiso). The particle size of the organic filler dispersed in thermoplastic resin through melt kneading and dispersion can be represented by the mean value to be determined by analyzing at least 10 particles in electromicroscopic observation of the cross section of the label followed by averaging the found data of the size of each particle.

[Additive]

In incorporating and kneading at least one of inorganic fine powder and organic filler in thermoplastic resin, if desired, additives such as antioxidant, UV stabilizer, dispersant, lubricant, compatibilizer, flame retardant, coloring pigment, etc. may be added thereto. In particular, in case where the label is used for durable materials for automobile parts, parts of home electric appliances, etc., preferred is adding thereto an antioxidant, a UV stabilizer, etc. Dispersant and lubricant are added, for example, for the purpose of dispersing the inorganic fine powder or the organic filler.

Heat-Sealable Resin Layer (B):

In the laminate film of constituting the label for in-mold molding, the heat-sealable resin layer (B) acts as an adhesive for bonding the label to the adherend, and is solid at room temperature; however, this is activated by the heat of the resin melted in molding the adherend in a mold and melt-adheres to the adherend, and after cooled, this again becomes solid and exhibits a strong bonding force. The heat-sealable resin layer (B) comprises at least a thermoplastic resin, and contains at least a thermoplastic resin having an activation temperature, at which the layer melt-adheres to the adherend, of from 110° C. to 180° C., preferably from 120° C. to 170° C., and in the label for in-mold molding, the layer is provided as a part of the laminate film, as laminated on the substrate layer (A). Various methods are employable as the means of providing the heat-sealable resin layer (B), and can be suitably selected from known means of a method of forming a laminate structure on one surface of the substrate layer (A) according to a dry lamination method or a hot lamination method, as well as an extrusion lamination method, a method of laminating a thermoplastic resin film via an adhesive, a method of coating with a thermoplastic resin, etc.

The thermoplastic resin for use in the heat-sealable resin layer (B) may be any of olefinic resin, polyethylene terephthalate resin, polyvinyl chloride resin, amide resin and polycarbonate resin as in the substrate layer (A). For example, in case where the adherend is a propylene-based resin, the layer preferably contains at least one selected from propylene homopolymer, propylene block copolymer and propylene random copolymer from the viewpoint of the miscibility between the two. Two or more different types of those resins may be used here as combined.

Further, any other known additive to resin may be added to the heat-sealable resin layer (B) within the range not detracting from the intended heat sealability of the layer. The additive includes dye, nucleating agent, plasticizer, mold release agent, antioxidant, flame retardant, UV absorbent, etc.

Layer Configuration:

The substrate layer (A) is stretched at least uniaxially, thereby forming pores around at least one of the inorganic fine powder and the organic filler therein serving as a nucleus. When the porosity is high, then the diffused reflection of light coming in the label increases and the opacity of the layer is thereby increased to facilitate the visual understanding of the printed direction. In addition, when the porosity is high, then the thermal conductivity of the label lowers, and if so, the heat of the molten resin of the adherend could be hardly released by the mold via the label and the heat-sealable resin layer (B) could be more readily activated to facilitate the melt adhesion thereof, and the bonding strength between the label and the adherend could be thereby increased.

In the label for in-mold molding, the substrate layer (A) contains a thermoplastic resin in an amount of from 40 to 90% by weight and at least one of an inorganic fine powder and an organic filler in an amount of from 10 to 60% by weight, and the heat-sealable resin layer (B) contains a thermoplastic resin in an amount of from 50 to 100% by weight but does not substantially contain an inorganic fine powder and an organic filler, or may contain at least one of them in an amount of from more than 0% by weight up to 50% by weight; and the laminate film is stretched at least uniaxially, and contains at least one of an inorganic fine powder and an organic filler, and the porosity of the laminate film is from 10% to 45%.

In the substrate layer (A), when at least one of the inorganic fine powder and the organic filler is in an amount of more than 60% by weight, then the laminate film breaks in the stretching step. On the other hand, when at least one of the inorganic fine powder and the organic filler is in an amount of less than 10% by weight, then the porosity lowers and the opacity also lowers, and if so, the direction could hardly be deciphered. The total content of the inorganic fine powder and the organic filler in the substrate layer (A) is preferably from 12 to 55% by weight, more preferably from 14 to 50% by weight, even more preferably from 16 to 45% by weight. The content of the thermoplastic resin in the substrate layer (A) is preferably from 45 to 88% by weight, more preferably from 50 to 86% by weight, even more preferably from 55 to 84% by weight.

Preferably, the composition of the substrate layer (A) is as follows. Specifically, it is desirable that the substrate layer (A) is a biaxially-stretched single-layer film having a resin composition that contains an inorganic fine powder in an amount of from 15 to 30% by weight, a high-density polyethylene in an amount of from 3 to 20% by weight, and a propylene-based resin in an amount of from 82 to 50% by weight. Also preferred is a stretched resin film that is prepared by laminating a uniaxially-stretched film having a resin composition that contains an inorganic fine powder in an amount of from 35 to 55% by weight, a high-density polyethylene in an amount of from 0 to 10% by weight and a propylene-based resin in an amount of from 65 to 35% by weight, to one side of a biaxially-stretched film having a resin composition that contains an inorganic fine powder in an amount of from 5 to 30% by weight, a high-density polyethylene in an amount of from 3 to 20% by weight and a propylene-based resin in an amount of from 92 to 50% by weight, and a uniaxially-stretched film having a resin composition that contains an inorganic fine powder in an amount of from 35 to 55% by weight, a high-density polyethylene in an amount of from 0 to 10% by weight and a propylene-based resin in an amount of from 65 to 35% by weight to the other side thereof.

The heat-sealable resin layer (B) may contain at least one of an inorganic fine powder and an organic filler in a total amount of less than 50% by weight for enhancing the anchorability thereof to the adherend and for increasing the bonding strength between the two. However, when the content thereof in the heat-sealability resin layer (B) is 50% by weight or more, then the inorganic fine powder or the organic filler may interfere with the adhesion thereof to the adherend, and if so, the bonding strength between the two may lower. Preferably, the total content of the inorganic fine powder and the organic filler in the heat-sealable resin layer (B) is from 5% by weight to less than 50% by weight, more preferably from 10% by weight to less than 50% by weight, even more preferably from 40% by weight to less than 50% by weight. The content of the thermoplastic resin in the heat-sealable resin layer (B) is preferably from 50 to 95% by weight, more preferably from 50 to 90% by weight, even more preferably from 50 to 60% by weight.

Various known methods are employable for mixing the resin ingredient that constitutes the label, and not specifically defined, the mixing temperature time may be suitably selected depending on the properties of the ingredients to be used. There may be mentioned a method of mixing the ingredients while dissolved or dispersed in a solvent, and a melt-kneading method. A melt-kneading method is good in point of the production efficiency thereof. There may be mentioned a method of mixing a thermoplastic resin in the form of a powder or pellets and at least one of an inorganic fine powder and an organic filler, and additives in a Henschel mixer, a ribbon blender, a super mixer or the like, followed by melt-kneading the resulting mixture in a double-screw melt extruder to extrude it as strands, and then cutting the strands into pellets; or a method of extruding the mixture into water via a strand die while cutting the strands with the rotary cutter fitted to the tip of the die.

Physical Properties of In-Mold Molding Label:
[Thickness]

The thickness of the substrate layer (A) falls within a range of from 20 to 250 µm, preferably from 40 to 200 µm. When the thickness is less than 20 µm, then the stiffness of the layer is poor, therefore often causing some problems in that the label could not be inserted and fixed in a regular position of the label in the mold with a label inserter or the label may be wrinkled. On the contrary, when the thickness is more than 250 µm, there may occur a deep cleavage in the boundary area between the adherend and the label so that the strength of the label in that area may lower and the impact-resistant strength of the adherend therein may also lower.

[Porosity]

The presence of pores inside the label can be confirmed by observing the cross section of the label with an electronic microscope. The porosity can be determined by taking the picture of the cross section with an electronic microscope followed by computing the ratio (%) of the area of the pores to the region of the cross section on the photographic picture. Concretely, the laminate film is buried in an epoxy resin and fixed therein, then, using a microtome, the sample is cut, for example, in the direction parallel to the film thickness direction (that is, in the direction perpendicular to the film surface), thereafter the cut face is metallized and observed with a scanning electronic microscope at any desired magnification for easy observation (for example, at from 500-power to 2000-power magnification), then the pore part is traced onto a tracing paper and blacked out, and the resulting image is processed with an image analyzer (Nireco's Luzex IID Model) thereby determining the areal ratio (%) of the pores to the measurement range to be the porosity (%). In this case, at least 10 points picked up at random in the measurement range are analyzed and the found data are averaged to be the porosity.

The porosity of the laminate film for the label for in-mold molding is from 10 to 45%, but is preferably from 12 to 44%, more preferably from 15 to 42%, even more preferably from 20 to 40%.

[Opacity]

The label for in-mold molding must be such that the direction printed thereon can be deciphered, and the opacity of the label or the laminate film based on JIS-P-8138 is preferably from 40 to 100%, more preferably from 50 to 100%, even more preferably from 60 to 100%. When the opacity is at least 40%, the print is not hidden by the color of the adherend and the direction can be readily deciphered.

[Thermal Conductivity]

The thermal conductivity of the label for in-mold molding is from 0.04 to 0.11 W/mK in order that the label can secure a sufficient bonding strength to the adherend even under the condition where the temperature and the pressure of the resin to be injected are lowered. When the thermal conductivity is more than 0.11 W/mK, then the heat insulation capacity of the label lowers and, if so and when the injection temperature of the resin to be the adherend is low, the resin is cooled and solidified before melt adhesion thereof to the heat-sealable resin layer (B) so that the bonding strength between the adherend and the label lowers and the label may readily swell or peel by friction, vibration or impact shock. Preferably, the thermal conductivity of the label is from 0.05 to 0.10 W/mK, more preferably from 0.06 to 0.09 W/mK, even more preferably from 0.07 to 0.08 W/mK.

The thermal conductivity can be determined according to the method described in ISO 22007-3. Concretely, it can be determined according to a thermal-wave analysis method in which thermal conductivity and thermal diffusivity are computed from the amplitude attenuation and the phase retardation to occur when the temperature wave generated on the surface of a sample diffuses in the thickness direction to reach the back thereof, for which, for example, usable is ai-Phase Mobile 1u Model by ai-Phase.

Production of In-Mold Molding Label:

The label for in-mold molding can be produced by combining various methods known to those skilled in the art. Use of any laminate film produced according to any method falls within the scope of the disclosure so far as the laminate film satisfies the condition stated in the claims.

[Lamination]

Preferably, the substrate layer (A) is stretched at least uniaxially from the viewpoint of pore formation for opacity, heat insulation and weight reduction and of molecular orientation for rigidity enhancement. In case where the substrate layer (A) is formed of multiple layers, preferably, at least one of those layers is stretched. In case where multiple layers are stretched, they may be individually stretched before laminated, or after laminated, they may be stretched. The stretched layers may be again stretched after laminated with no problem. After the heat-sealable resin layer (B) has been formed on the substrate layer (A), the whole may be stretched.

[Stretching]

Various known methods may be employed for stretching. The stretching temperature may be not lower than the glass transition temperature of the thermoplastic resin to be used when the resin is an amorphous resin, but when the resin is a crystalline resin, the stretching temperature may be within a temperature range suitable to the thermoplastic resin, which is from the glass transition temperature of the amorphous part of the resin to the melting point of the crystalline part thereof. Concretely, the film may be stretched in a mode of longitudinal stretching of using the peripheral speed difference between rolls, lateral stretching of using a tenter oven, rolling, inflation stretching of using a mandrel for tubular film, simultaneous biaxial stretching of using a tenter oven and a linear motor as combined, etc.

Not specifically defined, the draw ratio in stretching may be suitably determined in consideration of the intended use of the laminate film and the characteristics of the thermoplastic resin to be used, etc. For example, in case where a propylene homopolymer or copolymer is used as the thermoplastic resin and when the film is stretched uniaxially, the draw ratio may be generally from about 1.2 to 12 times, preferably from 2 to 10 times, and when stretched biaxially, the areal draw ratio may be generally from 1.5 to 60 times, preferably from 10 to 50 times. In case where any other thermoplastic resin is used and when the film is stretched uniaxially, the draw ratio may be generally from about 1.2 to 10 times, preferably from 2 to 7 times, and when stretched biaxially, the areal draw ratio may be generally from 1.5 to 20 times, preferably from 4 to 12 times.

Preferably, the stretching temperature is lower by from 2 to 160° C. than the melting point of the thermoplastic resin; and in case where a propylene homopolymer or copolymer is used as the thermoplastic resin, the stretching temperature is preferably lower by from 2 to 60° C. than the melting point thereof, and the stretching speed is preferably from 20 to 350 m/min. If desired, the stretched label may be annealed at high temperature.

By controlling the content of at least one of the inorganic fine powder and the organic filler and controlling the draw ratio in stretching, the opacity and the thermal conductivity of the label can be controlled.

[Coat Layer]

A coat layer may be provided on the surface of the substrate layer (A) for the purpose of enhancing the printing aptitude of the label. The coat layer may be formed by pigment coating according to an ordinary coating method for coated paper. As the pigment coating agent to be used in pigment coating, there may be mentioned an adhesive material usable for ordinary coated paper and comprising from 30 to 80% by weight of a pigment such as clay, talc, calcium carbonate, magnesium carbonate, aluminium hydroxide, silica, calcium silicate, plastic pigment or the like and from 20 to 70% by weight of latex, acrylic emulsion (aqueous solution of acrylate resin, etc.), starch, PVA (polyvinyl alcohol), CMC (carboxymethyl cellulose), methyl cellulose or the like. In addition, a dispersant such as a special sodium polycarboxylate or the like, a crosslinking agent such as polyamide-urea resin or the like, a defoaming agent, a waterproofing agent, a lubricant, a fluorescent coating agent and others may be added to the composition.

[Surface Treatment]

If desired, the surface of the substrate layer (A) or the coat layer may be processed for activation to enhance the printability thereof. The activation treatment is at least one treatment selected from corona discharge treatment, flame treatment, plasma treatment, glow discharge treatment, and ozone treatment; and preferred is corona treatment or flame treatment.

[Antistatic Layer]

An antistatic layer may be provided on the surface of the substrate layer (A) or the coat layer for bettering the paper feed performance of the label on a printer. The antistatic layer contains from 0.001 to 10 g, preferably from 0.005 to 0.1 g of an antistatic agent as the solid content thereof per unit area ($m^2$). When the amount of the antistatic agent is less than 0.001 g, then the layer could not sufficiently exhibit the antistatic effect thereof, but when more than 10 g, then the ink receivability of the label would be unsatisfactory and the printing ink may drop off during injection molding.

The antistatic layer may be formed, for example, by applying an aqueous solution containing an antistatic agent followed by drying it. As the coating method of applying the aqueous antistatic agent solution to the surface of a substrate layer (A) or the coat layer, herein employable is a die, bar, roll, gravure, spray, blade, air knife, size press or the like coating system, or a combination of any of these systems. After the coating agent has been applied, the coating layer may be further smoothed, or after the drying step, excessive water and hydrophilic solvent may be removed to form the antistatic layer. If desired, the antistatic layer contains an anchoring agent.

[Printing]

On at least one side of the substrate layer (A) or on the coat layer, printed is a precaution statement, a barcode, a manufacturer name, a sales company name, a product name, a how-to-use method or the like according to various printing methods of sheet-feed offset printing, rotary offset printing, gravure printing, flexographic printing, letter press printing, screen printing or the like. The printed label sheet may be blanked into individual labels having the necessary shape and size.

[Protective Layer]

A protective layer may be provided on at least one side of the substrate layer (A) or on the surface of the coat layer, a protective layer may be provided for the purpose of enhancing the fastness thereof such as lightfastness, waterproofness, vapor resistance, friction resistance, abrasion resistance or the like. Various methods may be employed for providing the protective layer. For example, the method may be suitably selected from known means such as a means of lamination according to a dry lamination method or a thermal lamination method of laminating a protective layer on at least one side of the substrate layer (A) or on the coat layer, or an extrusion lamination method, a method of coating with a thermoplastic resin, etc.

In-Mold Molding:

The label for in-mold molding may be inserted into an injection-molding mold in such a manner that the printed side of the label could face the inner wall of the mold, then fixed on the inner wall of the mold, and a molten resin may be injected into the mold from an injection unit, thereby giving a labeled, in-mold molded article in which the label is stuck simultaneously with molding. The labeled, in-mold molded article is free from label deformation or blistering, and the bonding strength between the adherend and the label is high.

For reducing the energy consumption and shortening the molding cycle in injection molding, the temperature of the resin to be injected is preferably lowered within a range within which the adherend is moldable. In case where the resin to be injected is a propylene-based resin, preferably, the resin temperature is from 200 to 250° C. When the temperature is lower than 200° C., there may occur short shot or weld line to give failed articles. Short shot indicates a phenomenon that the molten resin could not reach the peripheral part of the mold, and the weld line indicates a phenomenon that thin lines are formed in the part where the molten resins flowing in the mold join together, and along the line, the molded article may readily crack owing to strength insufficiency. When the temperature is higher than 250° C., too much time may be taken before the adherend is cooled and solidified, and such is inefficient. According to this disclosure, even when a propylene-based resin is injected in a temperature range of, for example, from 200 to 220° C., or even from 200 to 210° C., or still even from 200 to 205° C., a labeled, in-mold molded article having a good bonding strength can be produced.

Using the label for in-mold molding secures sufficient bonding strength between the adherend and the label even when the resin-injecting pressure in molding is lowered. Accordingly, when the label for in-mold molding is used, a labeled, in-mold molded article can be produced under a pressure lower than that in ordinary in-mold molding, and therefore the energy consumption can be reduced. For example, in case where the resin to be injected is a propylene-based resin, the injection pressure is generally from 60 to 150 MPa; however, when the label for in-mold molding is used, then an in-mold molded article in which the bonding strength between the adherend and the label can be produced even though the injection pressure is from 60 to 120 MPa, or further from 60 to 100 MPa, or still further from 60 to 80 MPa.

[Label Bonding Strength]

A bonding strength between the label and the adherend is from 250 g/15 mm to 1500 g/15 mm, preferably from 300 g/15 mm to 1200 g/15 mm, more preferably from 350 g/15 mm to 1000 g/15 mm. When the bonding strength is lower than 250 g/15 mm, then it is problematic in that the label may readily peel away owing to friction, vibration or impact shock given to the adherend during use.

EXAMPLES

The characteristics are described more concretely with reference to Examples and Comparative Examples given below.

Table 1 shows the type of the material used in producing each laminate film; and Table 2 shows the blend ratio (% by weight), the stretching condition, the thickness of each layer and the surface treatment.

In the following Examples, the material used, its amount and ratio, the details of the treatment and the treatment process may be suitably modified or changed not overstepping the sprit and the scope of this disclosure. Accordingly, the scope of this disclosure should not be limitatively interpreted by the Examples mentioned below.

Production of In-Mold Molding Label:

Example 1

The composition [a1] shown in Table 2 was melt-kneaded in an extruder set at 250° C., extruded out therethrough, and cooled to 70° C. with a cooling unit to prepare a unstretched single-layer sheet.

The unstretched sheet was heated at the stretching temperature (1) shown in

Table 2, and stretched by 5 times in the machine direction to prepare a longitudinally uniaxially-stretched film to be a core layer (A1). Next, the composition [a2] was melt-kneaded in an extruder set at 250° C., and laminated on one side of the longitudinally uniaxially-stretched film to prepare a laminate of print layer/core layer (A2/A1). Further, the composition [a3] and the composition [b] were separately melt-kneaded in different extruders at 250° C., and laminated on the opposite side of the above film in such a manner that the composition [b] could face outside, thereby preparing a four-layer laminate (A2/A1/A3/B) of composition [a2]/composition [a1]/composition [a3]/composition [b] to be print layer/core layer/interlayer/heat-sealable layer. Further, the laminate was heated at the stretching temperature (2) shown in Table 2, and, using a tenter stretcher, this was stretched by 8 times in the lateral direction to give a uniaxially/biaxially/uniaxially/uniaxially-stretched, four-layer laminate film.

The laminate film was cooled to 55° C., trimmed on the edges and cut into kiku-half size (636 mm×470 mm) sheets. On the print layer (A2) side thereof, the sheet was processed for corona discharge treatment at 30 W·min/m², and an aqueous solution containing 0.5% by weight of Mitsubishi Chemical's "ST-3200" (trade name) was applied thereto according to a size-pressing system in such a manner that the sheet could contain the antistatic agent in an amount of 0.01 g per unit area (m²), as the solid content thereof after dried, and then dried to provide an antistatic layer. As a result, sheet-fed sheets each having a laminate structure of antistatic layer/print layer/core layer/interlayer/heat-sealable layer (antistatic layer/A2/A1/A3/B) were obtained. In this, "print layer/core layer/interlayer" (A2/A1/A3) corresponds to the substrate layer (A).

Thus obtained, the kiku-half size sheet-fed sheets were printed, using an offset printer, Komori Corporation's Lithrone. The ink was T&K TOKA's UV BC161 (trade name). Concretely, in an environment at 23° C. and at a relative humidity of 50% and at a printing speed of 6000 sheets/hr, a UV offset four color print including informations and patterns of direction, product name, manufacturer name, sales company name, barcode, how-to-use method and others was printed on each sheet, and the ink on the printed side was dried by leading the sheets to run under a two-lamp system metal halide lamp (by Eye Graphics, 100 W/cm). Thus, 1000 sheets were continuously printed. Next, each sheet was blanked to give a label for in-mold molding having a width of 70 mm and a length of 90 mm. The configuration of the thus-obtained in-mold molding label is shown in FIG. 1.

Examples 2 to 3

In-mold molding labels were obtained according to the same method as in Example 1, except that the composition [b] was changed as in Table 2.

Example 4

A label for in-mold molding was obtained according to the same method as in Example 1, except that the composition [a1] was changed as in Table 2.

Examples 5 to 6

In-mold molding labels were obtained according to the same method as in Example 1, except that the stretching temperature (1) was changed as in Table 2.

Example 7

A label for in-mold molding was obtained according to the same method as in Example 1, except that the stretching temperature (1) was changed as in Table 2, and the thickness of composition [a2]/composition [a1]/composition [a3]/composition [b] was changed as in Table 2.

Example 8

A label for in-mold molding was obtained according to the same method as in Example 1, except that the thickness of composition [a2]/composition [a1]/composition [a3]/composition [b] was changed as in Table 2.

Example 9

A label for in-mold molding was obtained according to the same method as in Example 1, except that the antistatic layer was not formed on the substrate layer (A).

Example 10

Figure 2:
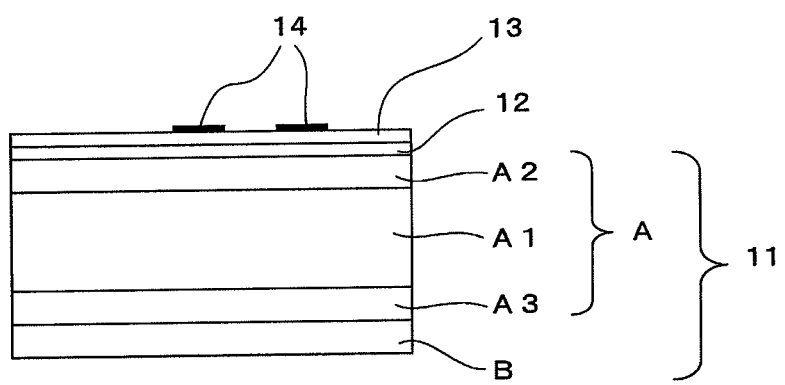
FIG. 2 This is a schematic cross-sectional view of the label for in-mold molding of Example 10.

A label for in-mold molding was obtained according to the same method as in Example 1, except that a coat layer mentioned below was further laminated on the print layer (A2) of the substrate layer (A) of the laminate film before printing. The coat layer was formed as follows: A water-base coating material comprising (C) 50% by weight of light calcium carbonate (Shiraishi Calcium Kaisya's Brilliant-15), (D) 10% by weight of kaolin clay (Thiele Kaolin's Kaofine 90), (E) 35% by weight of acryl/styrene copolymer resin emulsion (The Nippon Synthetic Chemical Industry's Mowinyl 8010) and (F) 5% by weight of special modified polyvinyl alcohol (The Nippon Synthetic Chemical Industry's Gohsefimer Z-100) was prepared (in which the numeral value of each constituent ingredient is in terms of the solid content thereof), applied to form a coating film of 10 g/m², and dried at 105° C. for 1 hour. In this case, in the inorganic powders (C) and (D), special sodium polycarboxylate (Kao's Poiz 520) serving as a dispersant was incorporated in an amount of 0.5 parts by weight relative to 100 parts by weight of the inorganic powders (C) and (D); and in the polyvinyl alcohol (F), polyamide urea resin (Taoka Chemical's Sumirez Resin 633) was incorporated in an amount of 10 parts by weight relative to 100 parts by weight of the polyvinyl alcohol (F). The configuration of the label for in-mold molding obtained in Example 10 is shown in FIG. 2, in which the coat layer-having laminate film was printed as above.

Example 11

Figure 3:
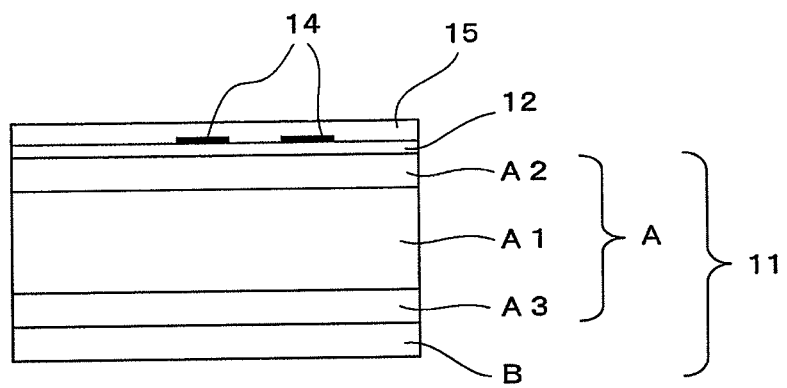
FIG. 3 This is a schematic cross-sectional view of the label for in-mold molding of Example 11.

A 30-μm unstretched polypropylene film serving as a protective layer was dry-laminated on the label for in-mold molding of Example 1, in which the laminate film was printed as above, at a temperature of 160° C. and under a pressure of 0.2 MPa for 1 second. Thus obtained, the configuration of the label for in-mold molding is shown in FIG. 3.

Comparative Example 1

A label for in-mold molding was obtained according to the same method as in Example 1, except that the composition [a2] and the composition [a3] were changed as in Table 2.

Comparative Example 2

A label for in-mold molding was obtained according to the same method as in Example 1, except that the composition [a1], the composition [a2], the composition [a3] and the composition [b] were changed as in Table 2.

Comparative Example 3

A four-layer resin film was produced according to Example 1 in JP-A 2006-309175, and this was used as a label for in-mold molding.

In-Mold Molding:

Using an injection molding machine (Niigata Enginnering's NV50ST; mold clamping force 50 tons, vertical unit) and using an injection-molding split mold to give a tabular adherend having a size of 130 mm (width)×150 mm (length)×1 mm (thickness), in which the mold was kept at 20° C., the label for in-mold molding obtained in Examples and Comparative Examples was fixed to the surface of the female mold fitted to the lower fixed platen in such a manner that the printed side of the label could face the mold. With that, the split mold was clamped, and then polypropylene (Nippon Polypropylene's "Novatec PP, MA3", MFR=11 g/10 min [230° C., 2.16 kg load]) was injected through an injection unit into the mold via the gate part at an injection resin temperature of 230° C. and an injection pressure of 60 MPa, whereby the label was melt-bonded to the injected resin and the injected resin was cooled and solidified. The mold was opened, and the label-stuck, tabular in-mold molded article was thus obtained. In addition, other label-stuck, tabular in-mold molded articles were produced in the same manner as above except that the injection resin temperature was changed to 200° C.

Measurement and Evaluation of Physical Properties:

The physical properties of the label for in-mold molding and the labeled in-mold molded articles of Examples and Comparative Examples were measured and evaluated according to the methods mentioned below.

[Thickness]

The thickness of the label for in-mold molding obtained in Examples and Comparative Examples was measured according to the method described in JIS-P-8118 (1998). The results are shown in Table 2. The thickness of each layer was determined by observing the cross section in the thickness direction of each sample with a scanning electro microscope (SEM) followed by computing the ratio of the constituent layers seen therein.

[Porosity]

The porosity of the laminate film of the label for in-mold molding obtained in Examples and Comparative Examples was determined according to the method described herein. Briefly, the cross section of the label was observed with a scanning electro microscope, as enlarged by 1000 times, and using an image analyzer (Nireco's Luzex IID Model), the areal ratio (%) of the pores to the measurement range was computed to be the porosity of the sample. In this case, 15 points were picked up at random in the measurement range, and the found data are averaged to be the porosity (%). The results are shown in Table 2.

[Thermal Conductivity]

The thermal conductivity of the label for in-mold molding obtained in Examples and Comparative Examples was determined, using ai-Phase Mobile 1u Model by ai-Phase and according to the method described in ISO 22007-3. The results are shown in Table 3.

[Opacity]

The opacity of the label for in-mold molding obtained in Examples and Comparative Examples was computed according to the method described in JIS-P-8138 (1976). The opacity is a numerical value computed by dividing the value measured with a black board set on the back of the sample by the value measured with a white board set on the back of the same sample, and is expressed by percentage. The results are shown in Table 3.

[Label/In-Mold Molded Article Bonding Strength]

The label stuck to the in-mold molded article, which had been molded at 230° C. or 200° C. in the above-mentioned injection-molding method, was cut into a piece having a width of 15 mm. Using Shimadzu's tensile tester "Autograph, AGS-D Model", the piece was tested for the bonding strength between the label and the adherend by peeling at 90 degrees at a pulling speed of 300 mm/min. The standard criteria for practical use of label are as mentioned below. The results are shown in Table 3.
A: From 600 to 1500 (unit, g/15 mm), and no problem at all for practical use.
B: From 250 to less than 600 (unit, g/15 mm), and no problem for practical use.
C: Less than 250 (unit, g/15 mm), and problematic for practical use.

[Printed Letter Decipherability]

The level of difficulty in deciphering the letters printed on the label stuck to the in-mold molded articles, which had been molded at 200° C. according to the above-mentioned injection-molding method, was determined according to the criteria mentioned below. The results are shown in Table 3.
A: The letters on the label were decipherable.
B: The letters on the label were undecipherable.

TABLE 1

| Materials of Substrate Layer (A) | | | | | |
|---|---|---|---|---|---|
| Constituent Ingredient | Type | Details | Density (g/cm$^3$) | Melting Point Peak (° C.) | Expression in Description |
| Thermoplastic Resin | Propylene Homopolymer (PP1) | [Japan Polypropylene's Novatec PP:FY4, product name] (MFR (230° C., 2.16 kg load) = 5 g/10 min) | 0.90 | 164 | Material 1 |
| | High-Density Polyethylene (HDPE) | [Japan Polyethylene's Novatec HD:HJ580, product name] (MFR (190° C., 2.16 kg load) = 12 g/10 min) | 0.96 | 134 | Material 2 |
| Inorganic Fine Powder | Calcium Carbonate (CaCO$_3$) | heavy calcium carbonate having a mean particle size of 1.0 μm and a specific surface area of 22,000 cm$^2$/g [Bihoku Hunka Kogyo's Softon 2200, product name] | 2.7 | — | Material 3 |
| Material of Heat-Sealable Resin Layer (B) | | | | | |
| Thermoplastic Resin | Propylene Homopolymer (PP1) | [Japan Polypropylene's Novatec PP:FY4, product name] (MFR (230° C., 2.16 kg load) = 5 g/10 min) | 0.90 | 164 | Material a |
| | Propylene/Ethylene Random Copolymer (PP2) | [Japan Polypropylene's Novatec PP:FG4, product name] (MFR (230° C., 2.16 kg load) = 7 g/10 min) | 0.90 | 145 | Material b |
| | High-Density Polyethylene (HDPE) | [Japan Polyethylene's Novatec HD:HJ580, product name] (MFR (190° C., 2.16 kg load) = 12 g/10 min) | 0.96 | 134 | Material c |
| Inorganic Fine Powder | Calcium Carbonate (CaCO$_3$) | heavy calcium carbonate having a mean particle size of 1.0 μm and a specific surface area of 22,000 cm$^2$/g [Bihoku Hunka Kogyo's Softon 2200, product name] | 2.7 | — | Material d |

TABLE 2

| Sample | Composition [a1] Material | Amount (wt. %) | Composition [a2] Material | Amount (wt. %) | Composition [a3] Material | Amount (wt. %) | Composition [b] Material | Amount (wt. %) | Stretching Temperature (1) (° C.) | Stretching Temperature (2) (° C.) | Layer Configuration and Number of Stretching Axes | Thickness after stretched (μm) | Draw ratio in stretching (MD/TD) | Porosity (%) | Surface Treatment Corona Discharge Treatment Intensity (W·min/m²) | Surface Treatment Solid Content of Antistatic Layer (g/m²) |
|---|---|---|---|---|---|---|---|---|---|---|---|---|---|---|---|---|
| Example 1 | 1<br>2<br>3 | 80<br>10<br>10 | 1<br>3 | 55<br>45 | 1<br>3 | 55<br>45 | a<br>c | 50<br>50 | 140 | 155 | (A2) uniaxial<br>(A1) biaxial<br>(A3) uniaxial<br>(B) uniaxial | 20<br>40<br>15<br>5 | 5/8 | 34 | 30 | 0.01 |
| Example 2 | 1<br>2<br>3 | 80<br>10<br>10 | 1<br>3 | 55<br>45 | 1<br>3 | 55<br>45 | b<br>d | 60<br>40 | 140 | 155 | (A2) uniaxial<br>(A1) biaxial<br>(A3) uniaxial<br>(B) uniaxial | 20<br>40<br>15<br>5 | 5/8 | 34 | 30 | 0.01 |
| Example 3 | 1<br>2<br>3 | 80<br>10<br>10 | 1<br>3 | 55<br>45 | 1<br>3 | 55<br>45 | b<br>d | 90<br>10 | 140 | 155 | (A2) uniaxial<br>(A1) biaxial<br>(A3) uniaxial<br>(B) uniaxial | 20<br>40<br>15<br>5 | 5/8 | 34 | 30 | 0.01 |
| Example 4 | 1<br>2<br>3 | 65<br>10<br>25 | 1<br>3 | 55<br>45 | 1<br>3 | 55<br>45 | a<br>c | 50<br>50 | 140 | 155 | (A2) uniaxial<br>(A1) biaxial<br>(A3) uniaxial<br>(B) uniaxial | 20<br>40<br>15<br>5 | 5/8 | 40 | 30 | 0.01 |
| Example 5 | 1<br>2<br>3 | 80<br>10<br>10 | 1<br>3 | 55<br>45 | 1<br>3 | 55<br>45 | a<br>c | 50<br>50 | 145 | 155 | (A2) uniaxial<br>(A1) biaxial<br>(A3) uniaxial<br>(B) uniaxial | 20<br>40<br>15<br>5 | 5/8 | 29 | 30 | 0.01 |
| Example 6 | 1<br>2<br>3 | 80<br>10<br>10 | 1<br>3 | 55<br>45 | 1<br>3 | 55<br>45 | a<br>c | 50<br>50 | 150 | 155 | (A2) uniaxial<br>(A1) biaxial<br>(A3) uniaxial<br>(B) uniaxial | 20<br>40<br>15<br>5 | 5/8 | 25 | 30 | 0.01 |
| Example 7 | 1<br>2<br>3 | 80<br>10<br>10 | 1<br>3 | 55<br>45 | 1<br>3 | 55<br>45 | a<br>c | 50<br>50 | 150 | 155 | (A2) uniaxial<br>(A1) biaxial<br>(A3) uniaxial<br>(B) uniaxial | 5<br>65<br>5<br>5 | 5/8 | 12 | 30 | 0.01 |
| Example 8 | 1<br>2<br>3 | 80<br>10<br>10 | 1<br>3 | 55<br>45 | 1<br>3 | 55<br>45 | a<br>c | 50<br>50 | 140 | 155 | (A2) uniaxial<br>(A1) biaxial<br>(A3) uniaxial<br>(B) uniaxial | 35<br>10<br>30<br>5 | 5/8 | 26 | 30 | 0.01 |

TABLE 2-continued

| Sample | Composition [a1] Material | Composition [a1] Amount (wt. %) | Composition [a2] Material | Composition [a2] Amount (wt. %) | Composition [a3] Material | Composition [a3] Amount (wt. %) | Composition [b] Material | Composition [b] Amount (wt. %) | Stretching Temperature (1) (° C.) | Stretching Temperature (2) (° C.) | Layer Configuration and Number of Stretching Axes | Thickness after stretched (μm) | Draw ratio in stretching (MD/TD) | Porosity (%) | Surface Treatment Corona Discharge Treatment Intensity (W · min/m²) | Surface Treatment Solid Content of Antistatic Layer (g/m²) |
|---|---|---|---|---|---|---|---|---|---|---|---|---|---|---|---|---|
| Example 9 | 1<br>2<br>3 | 80<br>10<br>10 | 1<br>3 | 55<br>45 | 1<br>3 | 55<br>45 | a<br>c | 50<br>50 | 140 | 155 | (A2) uniaxial<br>(A1) biaxial<br>(A3) uniaxial<br>(B) uniaxial | 20<br>40<br>15<br>5 | 5/8 | 34 | 30 | — |
| Comparative Example 1 | 1<br>2<br>3 | 80<br>10<br>10 | 1<br>3 | 97<br>3 | 1<br>3 | 97<br>3 | a<br>c | 50<br>50 | 140 | 155 | (A2) uniaxial<br>(A1) biaxial<br>(A3) uniaxial<br>(B) uniaxial | 20<br>40<br>15<br>5 | 5/8 | 5 | 30 | 0.01 |
| Comparative Example 2 | 1 | 100 | 1 | 100 | 1 | 100 | b | 100 | 140 | 155 | (A2) uniaxial<br>(A1) biaxial<br>(A3) uniaxial<br>(B) uniaxial | 20<br>40<br>15<br>5 | 5/8 | 0 | 30 | 0.01 |
| Comparative Example 3 | Label of Example 1 in JP-A 2006-309175 | | | | | | | | | | | | | | | |

TABLE 3

| | Physical Properties In-Mold Molding Label | | Evaluation Label/In-Mold Molded Article Bonding Strength (g/15 mm) | | |
|---|---|---|---|---|---|
| Sample | Thermal Conductivity (W/mK) | Opacity (%) | Injection Resin Temperature 230° C. | Injection Resin Temperature 200° C. | Printed Letter Decipherability |
| Example 1 | 0.08 | 87 | A (750) | A (720) | A |
| Example 2 | 0.08 | 87 | A (800) | A (780) | A |
| Example 3 | 0.08 | 87 | A (760) | A (720) | A |
| Example 4 | 0.05 | 95 | A (780) | A (740) | A |
| Example 5 | 0.09 | 83 | A (690) | B (500) | A |
| Example 6 | 0.10 | 80 | A (620) | B (350) | A |
| Example 7 | 0.08 | 45 | A (720) | A (670) | A |
| Example 8 | 0.09 | 81 | A (650) | B (480) | A |
| Example 9 | 0.08 | 87 | A (750) | A (720) | A |
| Example 10 | 0.08 | 93 | A (760) | A (730) | A |
| Example 11 | 0.08 | 88 | A (770) | A (740) | A |
| Comparative Example 1 | 0.13 | 71 | B (450) | C (180) | A |
| Comparative Example 2 | 0.12 | 5 | B (500) | C (220) | B |
| Comparative Example 3 | 0.08 | 88 | C (220) | C (20) | A |

INDUSTRIAL APPLICABILITY

According to this disclosure, there are obtained a label for in-mold molding and a labeled in-mold molded article, in which the label has a sufficient bonding strength to the adherend to which it is stuck even though the resin is molded under the condition where the temperature and the pressure of the resin to be injected are lowered, and in which the printed direction on the label can be deciphered.

This disclosure is favorably employed in the industrial field of producing in-mold molding labels and producing labeled, in-mold molded articles using the label, especially in motor industry and home appliance industry.

DESCRIPTION OF REFERENCE NUMERALS AND SIGNS

A Substrate Layer
B Heat-Sealable Resin Layer
A1 Core Layer
A2 Print Layer
A3 Interlayer
11 Laminate Film
12 Antistatic Layer
13 Coat Layer
14 Ink
15 Protective Layer

The invention claimed is:

1. A label for in-mold molding, which comprises a laminate film comprising a substrate layer (A) and a heat-sealable resin layer (B), wherein the substrate layer (A) and the heat-sealable layer (B) are in direct contact across the entirety of each of the substrate layer (A) and the heat-sealable layer (B), and the substrate layer (A) comprises a thermoplastic resin in an amount of from 40 to 90% by weight and at least one of an inorganic fine powder and an organic filler in an amount of from 10 to 60% by weight, the heat-sealable resin layer (B) comprises a thermoplastic resin in an amount of from 50 to 100% by weight, the laminate film is at least uniaxially stretched, the porosity of the laminate film is from 10% to 45%, the thermal conductivity of the label is from 0.04 to 0.08 W/mK, and the bonding strength of the label stuck to an adherend formed of a propylene-based resin at 200° C. and 60 MPa is from 600 to 1000 g/15 mm.

2. The label for in-mold molding according to claim 1, wherein the substrate layer (A) has a multilayer structure.

3. The label for in-mold molding according to claim 1, wherein the thermoplastic resin of the heat-sealable resin layer (B) comprises at least one selected from a propylene homopolymer, a propylene block copolymer and a propylene random copolymer.

4. The label for in-mold molding according to claim 1, wherein the laminate film further comprises a coat layer on a surface of the substrate layer (A) opposite a surface of the substrate layer (A) in direct contact with the heat-sealable layer (B).

5. The label for in-mold molding according to claim 4, wherein the coat layer is printed.

6. The label for in-mold molding according to claim 1, wherein the substrate layer (A) includes printing.

7. The label for in-mold molding according to claim 6, further including a protective layer on the printed layer.

8. The label for in-mold molding according to claim 1, of which the opacity is from 40 to 100%.

9. The label for in-mold molding according to claim 1, wherein the substrate layer (A) comprises a thermoplastic resin in an amount of from 50 to 90% by weight.

10. The label for in-mold molding according to claim 1, wherein the at least one of an inorganic fine powder and an organic filler is present in an amount of from 10 to 50% by weight.

11. The label for in-mold molding according to claim 10, wherein the at least one of an inorganic fine powder and an organic filler is an inorganic fine powder.

12. The label for in-mold molding according to claim 1, wherein the thermoplastic resin of the substrate layer (A) comprises an olefinic resin.

13. The label for in-mold molding according to claim 1, wherein the thermoplastic resin of the substrate layer (A) comprises an olefinic resin in an amount of from 50 to 90% by weight; the at least one of an inorganic fine powder and an organic filler comprises an inorganic fine powder in an amount of from 10 to 50% by weight; and wherein the thermoplastic resin of the heat-sealable layer (B) comprises at least one selected from a propylene homopolymer, a propylene block copolymer and a propylene random copolymer.

14. The label for in-mold molding according to claim 13, wherein the inorganic fine power is calcium carbonate.

15. A labeled in-mold molded article, which has the label for in-mold molding of claim 1 stuck to an adherend.

16. The labeled in-mold molded article according to claim 15, wherein the adherend is formed of a propylene-based resin.

17. The labeled in-mold molded article according to claim 15, wherein the article is for automobiles or home electric appliances.

18. A molding method for a labeled in-mold molded article, which comprises previously inserting the label for in-mold molding of claim 1 into a mold, and then injecting a molten propylene-based resin at 200° C. or higher into the mold to thereby give an in-mold molded article that has been labeled simultaneously with molding.

19. The molding method for a labeled in-mold molded article according to claim 18, wherein the temperature of the molten propylene-based resin to be injected is from 200 to 220° C.

20. The molding method for a labeled in-mold molded article according to claim 18, wherein the temperature of the molten propylene-based resin to be injected is from 200 to 210° C.

* * * * *